United States Patent
Pfeifer et al.

(10) Patent No.: US 10,563,756 B2
(45) Date of Patent: Feb. 18, 2020

(54) OPERATING LEVER AND METHOD FOR OPERATING AN OPERATING LEVER

(71) Applicants: ZF Friedrichshafen AG, Friedrichshafen (DE); Lemförder Electronic GmbH, Espelkamp (DE)

(72) Inventors: Ralf Pfeifer, Diepholz (DE); Andreas Peukert, Barnstorf (DE)

(73) Assignees: ZF Friedrichshafen AG, Friedrichshafen (DE); Lemförder Electronic GmbH, Espelkamp (DE)

( * ) Notice: Subject to any disclaimer, the term of this patent is extended or adjusted under 35 U.S.C. 154(b) by 951 days.

(21) Appl. No.: 15/036,746

(22) PCT Filed: Oct. 15, 2014

(86) PCT No.: PCT/EP2014/072071
§ 371 (c)(1),
(2) Date: May 13, 2016

(87) PCT Pub. No.: WO2015/071041
PCT Pub. Date: May 21, 2015

(65) Prior Publication Data
US 2016/0305539 A1 Oct. 20, 2016

(30) Foreign Application Priority Data
Nov. 15, 2013 (DE) .................. 10 2013 223 297

(51) Int. Cl.
*F16H 59/10* (2006.01)
*H04L 7/06* (2006.01)

(52) U.S. Cl.
CPC ............. *F16H 59/105* (2013.01); *H04L 7/06* (2013.01)

(58) Field of Classification Search
CPC .................................. F16H 59/105; H04L 7/06
See application file for complete search history.

(56) References Cited

U.S. PATENT DOCUMENTS 5,243,871 A * 9/1993 Weiten .................... F16H 59/02
74/473.12
5,285,781 A 2/1994 Brodard
(Continued)

FOREIGN PATENT DOCUMENTS

DE 214 047 A1 9/1984
DE 37 30 568 A1 3/1989
(Continued)

OTHER PUBLICATIONS

International Search Report and Written Opinion of the International Search Authority dated Jan. 30, 2015 in International Application No. PCT/EP2014/072071 (English and German languages) (18 pp.).
(Continued)

*Primary Examiner* — Vicky A Johnson
(74) *Attorney, Agent, or Firm* — Brinks Gilson & Lione (57) ABSTRACT

The current embodiments provide a control lever. The control lever may have a first connection unit with a plurality of inputs and at least one output. The at least one output may be configured for outputting an operation signal that represents the position of the control lever. The number of inputs of the plurality of inputs may exceed the number of outputs of the at least one output. The first connection unit may be configured to couple a first input of the plurality of inputs to the at least one output at a first point in time, and the connection unit may be configured to connect a second input of the plurality of inputs to the at least one output at a second point in time subsequent to the first point in time.

13 Claims, 6 Drawing Sheets

(56) References Cited

U.S. PATENT DOCUMENTS

| | | | | |
|---|---|---|---|---|
| 5,918,195 A | * | 6/1999 | Halgrimson | A01B 63/00 |
| | | | | 318/624 |
| 6,139,468 A | * | 10/2000 | Goates | F16H 59/105 |
| | | | | 477/906 |
| 2003/0034691 A1 | | 2/2003 | Wand | |
| 2008/0071448 A1 | | 3/2008 | Koski | |
| 2008/0242506 A1 | * | 10/2008 | Hori | F02N 11/0803 |
| | | | | 477/165 |
| 2013/0179115 A1 | | 7/2013 | Friedrich et al. | |

FOREIGN PATENT DOCUMENTS

| | | |
|---|---|---|
| DE | 197 49 330 A1 | 5/1999 |
| DE | 10 2007 041 226 A1 | 4/2008 |
| DE | 10 2009 049 220 A1 | 5/2011 |
| DE | 10 2010 022 110 A21 | 12/2011 |
| DE | 10 2011 082 033 A1 | 3/2013 |

OTHER PUBLICATIONS

German Search Report dated Jul. 29, 2014 for German Patent Appliction No. 10 2013 223 297.7 (German language) (9 pp.).

\* cited by examiner

OPERATING LEVER AND METHOD FOR OPERATING AN OPERATING LEVER

This application is a filing under 35 U.S.C. § 371 of International Patent Application PCT/EP2014/072071, filed Oct. 15, 2014, and claims the priority of German Patent Application 10 2013 223 297.7, filed Nov. 15, 2013. These applications are incorporated by reference herein in their entireties.

TECHNICAL FIELD

The present embodiments relate to a control lever, a method of operating a control lever, and a method for evaluating a control lever signal.

BACKGROUND

With purely manual transmissions, cable-operated gear shifts are still being developed and produced. In recent years, the trend goes for electronic data transmission between the gear selector lever and the transmission.

First intermediate stages have connected the transmission and the gear selector lever to a cable harness. The cable harness was nothing more than an electrical extension cord to be able to spatially separate functions. The disadvantage was that the number of lines in the cable harness was dependent on the functions and generally the cable harness was becoming heavy, longer and more expensive. The resulting number of additional services was reduced only by the introduction of a bus system in the vehicle (the currently dominant system is CAN). At the same time, the lines were no longer used individually for signals, but for the transmission of messages. This means increased effort at the end points, because messages must be encoded, decoded and the correctness of transmission must be ensured.

Some gearshift systems existing on the market have only an electronic connection to the vehicle. The information is transmitted, for example, by the duty cycle of a PWM signal or by the CAN bus with regular CAN messages. These gearshifts referred to as "shift-by-wire" or in short SbW have a number of advantages over other electric and mechanical interfaces, in particular:

When connecting by the CAN bus, two lines for the bus plus power are enough to exchange all information with the transmission and other control devices (e.g. instrument cluster).

The gear selector lever can be placed anywhere in the working area of the driver.

There can be realized a decoupling from mechanical vibration (NVH) because no holes in the passenger compartment for cables, no bending radii for cables or rigid kinematics need to be observed.

A simple transfer to other platforms/series can be done because adaptation by configuration is possible.

A quick installation in production is ensured because no wiring and adjustments are necessary.

A free choice of the type of actuation is possible because actuation forces and routes or operating locks can be configured as desired.

Additional functions such as force feedback, automatic extension and retraction of the gear selector lever can be easily implemented.

The following disadvantages are known in the prior art:

The transfer of information in a SbW system also requires a corresponding cost of processing, encoding, decoding, and to ensure the integrity of the information as well as the processing components. Typically, this requires:

a complete logic, consisting of
additional hardware, in particular a microcontroller (μC, CPU),
components for communication (transceiver) and more complex components for CAN bus connection,
software for functions, diagnosis
redundancy of the components mentioned for securing
monitoring of the entire development with methods of functional safety (in particular on the basis of ISO 26262),
space for these components which limit particularly the slim gear selector levers
increased energy expenditure and thus also thermal problems in a tight space as well as a higher weight.

These requirements increase mainly the development costs by more specialists, more tests, more tools, unit cost due to more hardware, longer cycle times and the duration of the development of more features.

From experience and statistical justification, we can also expect that more people involved in the development of a more complex product also overlook more mistakes and thus higher subsequent costs or warranty provisions are necessary.

Against this background, the approach presented here provides an improved control lever, an improved method for operating such a control lever, and a method for evaluating a control lever signal. Advantageous embodiments result from the following description.

BRIEF SUMMARY

The approach presented here provides a control lever for generating a control lever signal, which represents a selection of a position out of a plurality of possible positions of the control lever, characterized in that the control lever comprises a connecting unit having a plurality of inputs and at least one output for outputting the control signal from the control lever, in particular wherein a number of inputs exceeds a number of outputs, wherein the connection unit is adapted to connect at a first time a first of the inputs to the at least one output and subsequently to connect at a second time following the first time a second input to the at least one output.

A control lever can be understood a mechanical unit, through which a user can perform a variety of different functions by manually setting a switch to one of several positions. For example, the control lever can be a part of a vehicle, in particular be a transmission unit, wherein for example a driver of the vehicle can select a gear by the control lever.

Alternatively or additionally, for example, the transmission can be shifted by the control lever to a parking position or to neutral, particularly when the transmission is an automatic transmission. A connecting unit can be understood a mechanical, electrical or electronic component, which represents a switch, by means of which a signal can be redirected from one of several inputs to an output. For example, an electrically conductive connection between the respective input and output can be established. Similarly, for example, an electrically conductive connection can be established from the output to the respective input of such a connection unit. In particular, a connection can have a greater number of equalized inputs. In this way, the transmission of a larger number of available signals or information can be made on a (smaller) number of available signal lines. A first time can be understood a point in time or a time interval, which chronologically lies before the second point in time.

The approach presented here is based on the realization that using a connecting unit, a large number of different information or sensor signals can be transmitted very efficiently through a small number of signal lines. This approach is advantageous in particular in that now no or only a very little pre-processing or coding information transmitted over the signal line or signal lines is required. Rather, a technically very simple and thus cost-effective implementation of information transmission of a control lever by means of the control lever signal can be effected by the transmission of information or signals in different time slots.

According to an advantageous embodiment, the communication unit can be configured to separate the second input from at least one output at the first time, and/or at the second time to separate the first input from at least one output. Such an embodiment provides the advantage of being able to transmit unique and easily identifiable information with very few signal lines.

In some embodiments, the connection unit comprises a multiplexer and/or a counter.

According to a further embodiment, at least one sensor for detecting the position of the control lever as the control lever signal can be provided. The sensor can be connected to at least one of the inputs of the connection unit. Such an embodiment has the advantage of being able to output a sensor signal as a very simple control lever signal without the need for special treatment of the sensor signal.

In a further advantageous embodiment, the connection unit is configured to connect a first one of the inputs to the at least one output at a third point in time after a second point in time, in particular wherein the connection unit is formed to repeat the connection of the first input to the at least one output, or of the second input with the at least one output.

Such an embodiment offers the advantage, by an alternating switching of a connection of the output between the first and the second input to be able to detect, within a predefined time interval, a change of a value at the first input or the second input. Thus, the selection of the predetermined time interval can achieve an additional degree of freedom in the transmission of the different values at the inputs of the connection unit.

In some embodiments, the connection unit is designed to connect one of the inputs to at least one output in response to a timer signal generated in the control lever and/or in response to a control or timer signal supplied externally to the control lever. The use of a timer signal generated in the control lever offers the advantage of being able to save a signal line from an external control unit. A timing of the connecting unit on the basis of an externally supplied control or timer signal on the other hand offers the advantage of synchronized and thus highly reliable evaluation of the control lever signal.

In order to monitor a position of the connection unit, in particular in order to check which input of the connection unit is currently coupled to the output, according to a particularly advantageous embodiment, a reference signal providing unit coupled to at least the second input of the connection unit can be provided. Here, the reference signal providing unit can be designed to send a predefined reference signal at least to the second input of the connection unit. A reference signal providing unit can be understood a unit that provides a defined reference signal, which upon the connection of the second input of the connection unit provides this reference signal as a control lever signal. If now the reference signal is recognized by an evaluation unit as a control lever signal, it can be concluded that the connection unit has connected the output to the second input.

For example, such a reference signal providing unit can be very simply technically formed as a resistor network, where a specific potential or a predetermined voltage at the second input is provided as a reference signal.

Particularly in the case of a larger number of inputs of the connection unit, an embodiment is advantageous, in which the reference signal providing unit is coupled to a plurality of inputs of the connection unit. Here, the reference signal providing unit can be formed in order to send the reference signal or different reference signals to the inputs connected to the reference signal providing unit, in particular wherein between the inputs of the connection unit connected to the reference signal providing unit is arranged at least one further input of the connection unit.

Such an embodiment offers the advantage that with a reference signal providing unit that is technically very simple to implement, a quick and unambiguous detection or verification of the linking of the inputs to an output of the connecting unit is possible.

A further particularly advantageous embodiment is an embodiment, in which a second connecting unit is coupled to the connection unit, which second connection unit has a plurality of inputs and at least one output for outputting the control signal from the control lever and/or to provide an input signal for an input of the connection unit. Here, the second connecting unit may be designed to connect a first input of the inputs of the second connection unit with the at least one output of the second connection unit, and, at a second point in time following a first point in time, to connect a second input of the inputs of the second connection unit with at least one output of the second connection unit. Such an embodiment has the advantage of being able to use, by a control of two connecting units, for example, technically simpler and therefore more cost-effective connection units. Furthermore, such an embodiment allows implementing an improved verification of the correct functioning of the control lever or at least one of the connecting units.

In a further advantageous embodiment, the second connection unit is configured to connect one of the inputs of the second connecting unit with at least one output of the second connection unit in response to a timer signal generated in the control lever and/or in response to a control signal or timer signal externally sent to the control. To technically very simply detect a fault in a unit of the control lever or in one of the connecting units, in accordance with another embodiment, at least one input of the second connection unit can be coupled to at least one input of the connection unit.

There is also conceivable an embodiment in which at least one input of the second connection unit is coupled and/or connected to at least one output of the connection unit. Such an embodiment has the advantage that by the staggered connection of the two connection units, for example, connection units can be used, which have a very small number of inputs. This simplifies the control of the individual connection units and also allows the use of smaller and thus more cost-effective connection units in the control lever.

Also advantageous is an embodiment of a method for operating a control lever according to a variant presented here, wherein the method comprises the following steps: connecting a first one of the inputs to the at least one output at a first time; and coupling a second one of the inputs to the at least one output at a first point in time following the second point in time.

Such an embodiment also allows implementing the advantages of the approach presented here.

There is also conceivable an embodiment of a method for evaluating a control lever signal outputted from a control lever according to a variant of a control lever described here, wherein the method comprises the steps of:

Examining temporal sections of the control lever signal to a predetermined reference signal level out; and outputting information representing signal information that is contained in a temporal section of the control lever signal, which does not have the predetermined reference signal level.

Also advantageous is a device for controlling the steps of the above method for operating a control lever in accordance with a variant presented here.

Such a device may be an electrical device which processes sensor or data signals and in response outputs control signals. The device can comprise one or more suitable interfaces that can be configured as hardware and/or software.

In a hardware configuration, the interfaces can be for example part of an integrated circuit in which are implemented the functions of the device.

The interfaces can also be autonomous, integrated circuits, or at least partially be composed of discrete components. In a software configuration, the interfaces can be software modules that are present, for example, on a microcontroller in addition to other software modules.

An advantageous is also a computer program product with a program code which can be stored on a machine readable medium, such as a semiconductor memory, a hard disk memory or an optical memory and is used for performing the method according to one of the embodiments described above, when the program is performed on a computer or a device.

BRIEF DESCRIPTION OF THE DRAWINGS

The current embodiments are explained in more detail based on the accompanying drawings. The figures show.

DETAILED DESCRIPTION

In the following description of preferred embodiments, the same or similar reference numerals are used for the similarly acting elements shown in the various figures, while a repeated description of these elements is dispensed with.

The following description describes some electronic components that form at least a portion of a selection lever or control lever, but in principle they could be provided by other components.

First, at least one multiplexer is used as a connection unit. A multiplexer (also denoted with the abbreviation "mux") is equipped with a large number of inputs, a small number of control inputs and one output. With n control inputs, the mux has e=2n inputs. From the inputs, exactly one is connected to the single output. Which one it is, is determined by the n control inputs, which obtain each a logical 0 or 1. The values at the control inputs can be conceived and written as a binary number. This binary number indicates which input is being connected to the output. A common size for multiplexers are n=4 control inputs and e=16 inputs.

Furthermore, a synchronous counter may be used in the presented embodiments. A synchronous counter has one input and n outputs. As soon as at the input an edge change (e.g. logic 1 to logic 0) occurs, the synchronous counter increments by the value 1. At its n outputs is then available the next larger binary number. At the input, for example, a timer generator can for example cause the increment at the n outputs. However, the timer can also be from another source and need not be periodic.

A timer is also used in the presented embodiments. The timer has only one exit and periodically changes from 0 to 1 and back to 0.

To display signals or states, a lamp may be used. A lamp is used for the output. In this connection, after a short current pulse, a lamp should emit an afterglow for a certain time. For the purpose of diagnosis, the lamp may have a further output to read back current or voltage. Thus it should be possible to check the function of the lamp during operation.

Another element which may be used in the embodiments is a sensing device or switch. Sensing devices make it possible to detect an active pressing by a person. For the purpose of diagnosis, the sensing device can be duplicated. For further optimization of the diagnosis, the signal of the second sensing device can be inverted. As a further improved diagnosis, the sensing device can switch between voltage levels by means of pull-up resistors, which are identical neither to the supply voltage nor to mass.

Finally, sensors as electronic components may be used in the embodiments of a gear selector lever or control lever. Sensors are elements which can detect without contact, for example, the position of a mechanical component, in particular a selector lever or control lever. Sensors can be connected inductively, capacitively or optically, or by the Hall effect. Some types of sensors can also detect a parameter analogously, for example, distance or angle. For the purpose of the diagnosis, sensors can be designed in duplex to detect a particular position.

A microprocessor with suitable peripherals may well emulate the aforementioned components. However, the approach described here should propose above all cost-effective components which require low development scopes for functional safety according to ISO 26262.

The concept presented here is to combine the advantages in the function of the microcontroller-controlled SbW system with a simple electrical system, and at the same time reduce the complexity and cost. The key element of the consideration is as follows: The gear selector lever in the usual concepts needs just one interface to other components of the vehicle, namely to the transmission. Direct communication with other components is required only in exceptional cases and can be taken over by the transmission control unit.

An SbW circuit requires, for example, an electronically controlled transmission; in this respect, the approach presented here on the prior art can be used anywhere SbW has been possible so far. The transmission already has all the necessary logic components, its upgrade will be reflected primarily in the software and will therefore be rather simple and inexpensive. Although transmission control device should perform numerous functions and are designed accordingly, there is a certain probability that their performance or the memory size of the microcontroller should be adapted for the embodiments presented here. Instead of the transmission of messages/information, the cable connection between the transmission and the gear selector lever is only a technically undemanding and a direct line extension.

To avoid the disadvantages of an extensive cable harness, the approach presented here uses a very simple principle of transmission technology of multiple signals over a few lines: A simple switch in the gear selector lever connects the relevant components in the transmission and the gear selector lever.

Components of the gear selector lever according to an embodiment are in this connection, for example, sensors, locks/locking solenoids, lamps (e.g., LED) for night lighting and display of the gear and/or switches for transmission functions (P button, manual mode) to control the driving dynamics and (optionally) of the all-wheel drive. An advantageous further development of the approach proposed here in principle can be seen in a cyclic circuit of the connections, especially by multiplexers.

In the following text, the approach presented here is exemplified by the following components in more detail based on the block diagram of FIG. 1.

Figure 1:
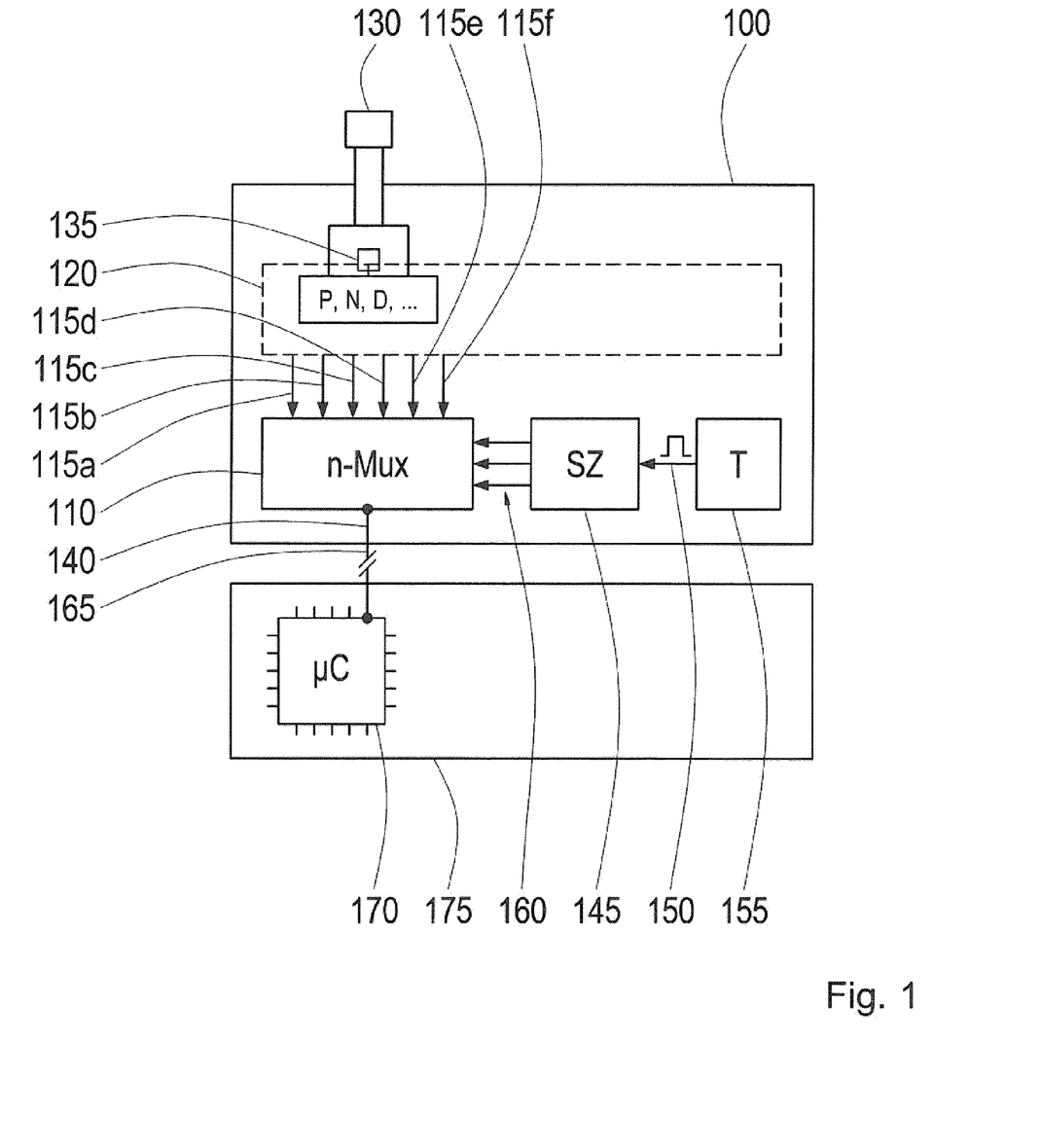
FIG. 1 shows a block diagram of an interconnection of a connection unit according to an embodiment of a control lever.

FIG. 1 shows a control lever 100 which, for example, represents an assembly which is provided as a gear selector lever for controlling a transmission of a vehicle not shown in FIG. 1. This control lever 100 comprises a connection unit 110, which is formed for example as an n-multiplexer (n-mux). The connection unit 110 has six inputs 115a to 115f, which can supply signals to the connection unit 110, which represent various functions 120 of the selector lever or control lever 100. An example of one of the functions 120 of the control lever 100 can be, for example, that a switching element 130 is in a position, which represents a position (P) of the transmission. Other examples of the functions 120 of the control lever 100 can be, for example, that the switching element 130 is in a position (P), which represents neutral (N) or a reverse gear R) of the transmission. The position of the switching element 130 can be detected by one or more sensors 135 which provide a corresponding signal which is then applied, for example, to one of the inputs 115 of the connection unit 110 or is generated there. It is evident from the following description that further possibilities for signals or features 120 of the control lever 100 are conceivable.

To now be able to connect the individual inputs 115a to 115f to the (single here) output 140 of the connection unit 110, a synchronous counter 145 (SZ) is used which is supplied with a timer 150 of a timer generator 155 (T). In this case, in response to certain timer flanks of the timer signal 150 the synchronous counter 145 continues to count, whereby at the outputs 160 of the synchronous counter 145 a binary data word is output corresponding to the count of the synchronous counter 145. The outputs 160 of the synchronous counter 145 are thereby used as control inputs of the connection unit 110, so that for example according to the meter reading 145 at the outputs 160 of the synchronous counter, one of the inputs 115a to 115f is electrically conductively connected to the output 140 of the connection unit 110. In this way, in technically very simple way, a signal at one of the inputs 115a to 115f can be outputted as the lever signal 165 at the output 140 of the connection unit 110. This control lever signal 165 can then be processed and analyzed in a processing unit 170, such as a microprocessor or appropriate logic in a transmission control unit 175, wherein this transmission control unit 175 can now be arranged, for example, in a transmission, which is distant from the control lever 100 and is arranged in the power transmission line of the vehicle.

As shown as an example in FIG. 1, the connection unit 100 can comprise one or more n-multiplexers (mux, n-mux) with e=2n inputs, n control inputs and an output, a synchronous counter 145 (SZ) with n outputs, which control the n-mux, and a CJK input for a timer 155 (T). The synchronous counter 145 and the timer can also be understood as subunits of the connection unit 110 in another embodiment.

According to an embodiment, the structure of the connection unit 110 can consist of the following components or include these components:

1) at least one (e.g., analog) multiplexer (mux) in the gear selector lever 100, controlled by a timer 155 (T), whereby the mux:

a) at regular time intervals and in a predefined order
 b) connects each input of its inputs to its output,
 c) wherein each input of mux is in turn connected to a functional unit (single LED, single sensor, key contact), or alternatively
 d) is connected to a known and fixed voltage level as a reference parameter, so that without the knowledge of the clock it is known at the output, which function unit has been/is read out as last/next, so that for a short moment alternately always one functional unit in the gear selector lever 100 or a voltage level is connected to the transmission through the output of the mux; and 2) at least one resistor network as the reference signal providing unit which provides different voltage levels.

On the transmission side should be in a transmission control unit 175 at least one I/O port, through which the output 140 of the mux is permanently connected to a pin of the microcontroller 170 in the transmission or the transmission control unit.

According to DIN 44300, a multiplexer (abbreviated as mux) is a functional unit which passes information from a number n of channels to a different number m of channels.

Generally it can be said that a multiplexer or more generally a connection unit is able to connect at a first point in time a first one of the inputs of the connection unit to the output and at a second point in time connect a second one of the inputs of the connection unit to the output. Here, the first point in time can follow the second point in time.

Figure 2A:
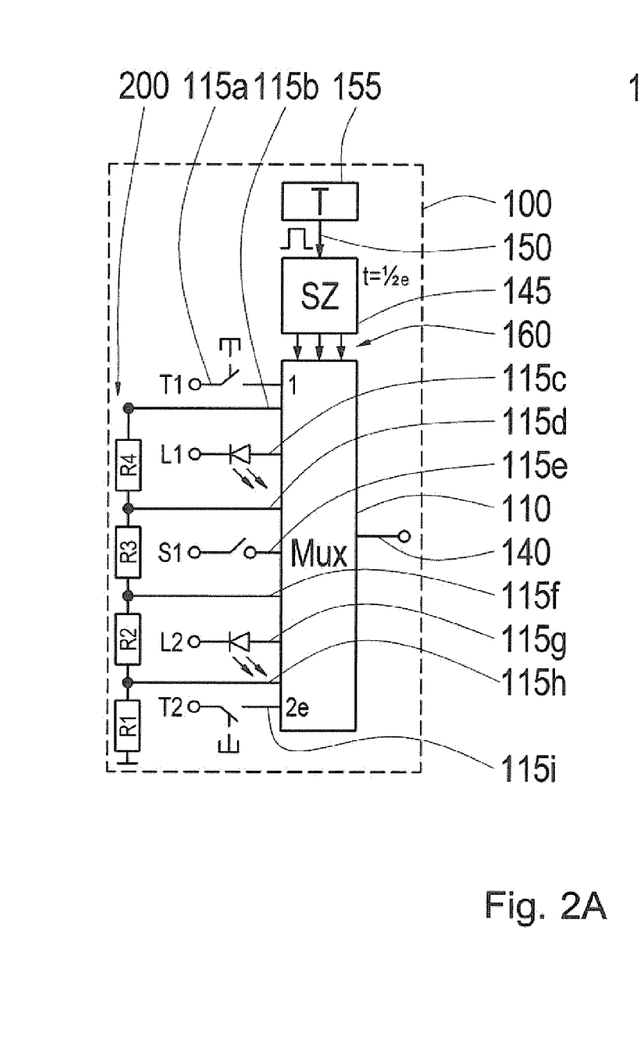
FIG. 2A shows another block diagram of an interconnection of a connection unit according to an embodiment of a control lever.
Figure 2B:
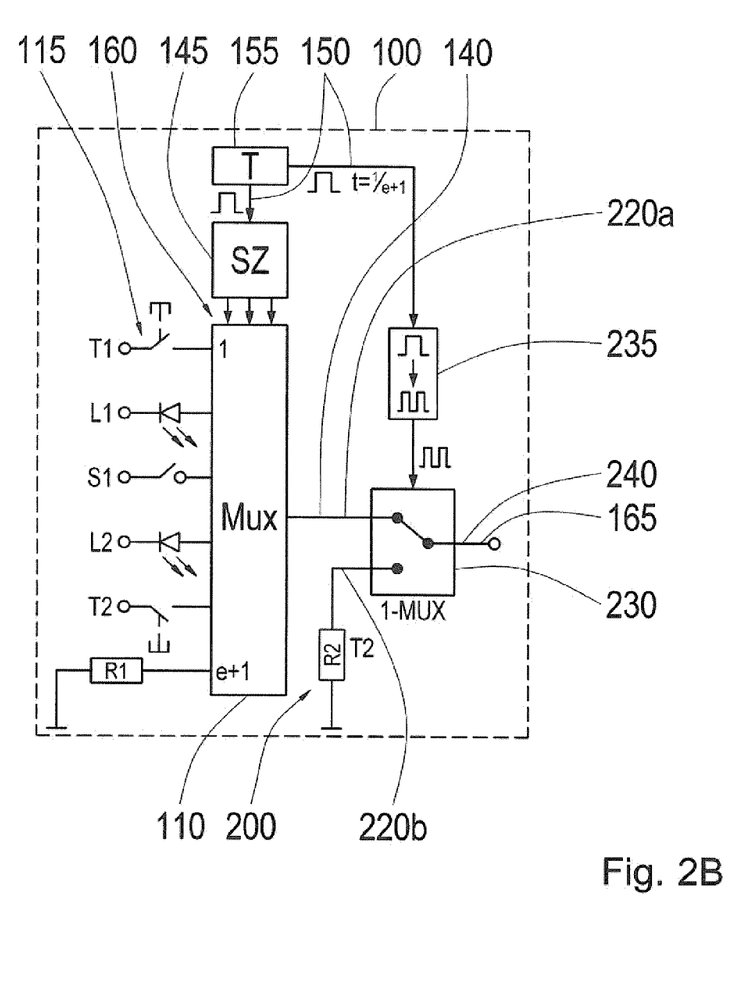
FIG. 2B shows another block diagram of an interconnection of a connection unit according to an embodiment of a control lever.

Some particular embodiments are explained below, and in particular a connection unit 110 that can be used for this purpose. To use the simplest possible components in a marketable design, the partial FIGS. 2A and 2B of FIG. 2 show two variants of a connection unit 110 for use in a control lever 100.

Here, the mux needs for x useful signals and x fixed voltage levels so that at the transition to a new useful signal a voltage level is always applied for a certain period, at which the transmission control unit can detect the change of the useful signal. The mux requires e=2·x inputs. These fixed voltage levels can be provided as a reference voltage, for example, by a resistor network 200, which then acts as a reference voltage supplying unit 200. Part 2A of FIG. 2 shows a block diagram of a connection of the connection unit 110 with such a reference voltage supplying unit 200.

The signal of a sensing device T1 is applied to a first input 1 of the connection unit 110.

The distant input of the connection unit 110 is under a potential which is supplied by a voltage source to ground. At a third input of the connection unit 110 is a signal of a first lamp L1 (which may also be a LED).

At a fourth input of the connection unit 110 is a voltage signal which is sent by a connection through resistor R4 to the second input as a reference signal. On the fifth input of the connection unit 110 is a signal corresponding to a sensor value of a sensor S1, which represents, for example, a position of the shift lever 130 in FIG. 1. At the sixth input is a voltage signal as a reference signal, which is received by a connection of the sixth input to the fourth input via a resistor R3. At a seventh input of the connection unit 110 is a signal of a second lamp L2 (which may also be a LED). At the eighth input of the connection unit 110 is a voltage level as a reference signal, which is received by a connection of the sixth input via a resistor R2. The eighth input of the connection unit 110 is also connected via a resistor R1 to a ground terminal. At the ninth input of the connection unit 110 is a signal of a second sensing device T2. Thus, the interposition of respective reference voltage levels or signals requires a high number of 2e inputs of the connection unit 110 to then very clearly recognize in the transmission control unit 175 (not shown in FIG. 2A) the forwarding of an input of the connection unit 110 to the output 140 of the connection unit 110. The synchronous counter 145 should share the clock signal 150 in a ratio of 1 to 2e to cyclically accomplish the connection of the inputs 115 of the connection unit 110 to the (single) output 140.

In this case, a reference voltage supply unit 200 can be formed by the voltage divider circuit as a resistor network for urging the second, fourth, sixth and eighth input of the connection unit 110. A defined voltage level can be applied as a reference voltage to the individual inputs, which during cyclical switching of the inputs to the output makes possible a clear distinction or differentiation of signal values from different sensors, lights or buttons. A different voltage level can be applied to each of the inputs of the connection unit 110, so that the current connection circuit of the connection unit 110 can be clearly identified by the recognition and analysis of the respective voltage level. If the second input is not connected with a specific reference potential or a certain voltage level, the resistance network can put the second, fourth, sixth and eighth inputs of the connection unit 110 at a uniform, i.e., the same potential level.

Although in this way, it can no longer be clearly distinguished in which position is currently the connection unit 110, a separation of two values, for example, of the sensor and one of the lamps, can still be uniquely identified.

In a modification of the circuit structure of FIG. 2A, in the embodiment of FIG. 2B, a connection unit 140 can be used, which requires much fewer inputs 115.

Therefore, for example, at the inputs 115 of the connection unit 140 are present only the signals of the first switch T1, the first lamp L1, the (first) sensor S1, the second lamp L2, of the second switch T2 and a reference signal which is obtained using a resistor R1 against ground potential. The output 140 of the connection unit 110 is connected to a first input 220a of a second connection unit 230.

The second input 220p of the second connection unit 230 is connected via a resistor R 2 to a ground potential. In this way, the second connection unit 230 is configured as 1 multiplexer, while the (first) connection unit 110 is configured as a multiplexer with e+1 inputs 115. The second connection unit 230 can thus increase (or lower) the clock signal 150 by a clock processing unit 235 and thus switch the second connection unit 230. In this way, on an output 240 of the second connection unit 230 can be also outputted a control lever signal, which is now provided by a reference signal at the second input 220b of the resistor R2 now serving as a reference signal providing unit 200.

In this way, the mux of the connection unit 110 requires for e useful signals only e+1 inputs, because only one value is stored as voltage level directly in the mux, for example, to mark the end of a (through-connection) cycle. Alternatively, such an end of a cycle does not need to be marked by a voltage level correspondingly to the resistor R 1 so that the multiplexer of the connection unit 110 would then require only x inputs. The output 140 of the mux goes to an input 220a of a switch as a second connection unit 230 which alternately connects the mux 110 and a fixed voltage level to the transmission. The timer 155 of the switch 230 receives its clock from a divider 235 which divides the clock of the timer 155 in a fixed ratio.

The advantage of the variant shown in FIG. 2B is in the following aspects: The number of inputs for the mux can be (almost) halved from e=2·x to e=x+1 so that a more favorable mux 110 may be used. The time ratio of the useful signal (from the mux) to the voltage level no longer needs to be of the same length (1:1), but can be extended for the benefit of the useful signal (e.g. 3:1). For example, a time period in which a reference signal or reference level from one of the inputs of the connection unit 110 or 230 is sent to the relevant output 140 or 240 can be smaller than a time period in which another signal from one of the inputs the connection unit 110 is sent to the respective output 140 or 240. Thus, for example, a LED as a lamp L1 or L2 can be energized longer and is less prone to flicker.

The embodiments already described above can be advantageously modified. For example, a function or information on a position of the shift lever, which is needed more frequently, can be placed on more than one input 115 of a connection unit 110 or a second connection unit 230 or a mux.

Furthermore, a switching structure according to the diagram of FIG. 2A or the diagram of FIG. 2B, or a combination of the two switching structures can be installed in the gear selector lever in a multiple design. Each module of FIG. 2A and/or FIG. 2B requires then a respective signal line to the transmission control unit 175; in return the entire system of the gear selector lever 100 and the transmission obtains more space in the design. So, for example, functions can be conducted through a mux, while other non-critical functions are conducted through another mux. In this respect, for example, a separation can be carried out in that information and signals with high importance are transmitted through a first connection unit while other information or signals with a lower importance are transmitted through the second connection unit.

In this case, for example a component of high reliability can be used for the first connection unit, while a cheaper and simpler component can be used for the second connection unit.

As far as safety requirements can be separated, a separate mux can also be used for each safety requirement so that the failure of a mux blocks at best a safety-related function.

Diagnostic functions can also be addressed through a separate mux and clock frequencies can be generated, depending on the mux, by their own, differently quick timers.

Figure 3:
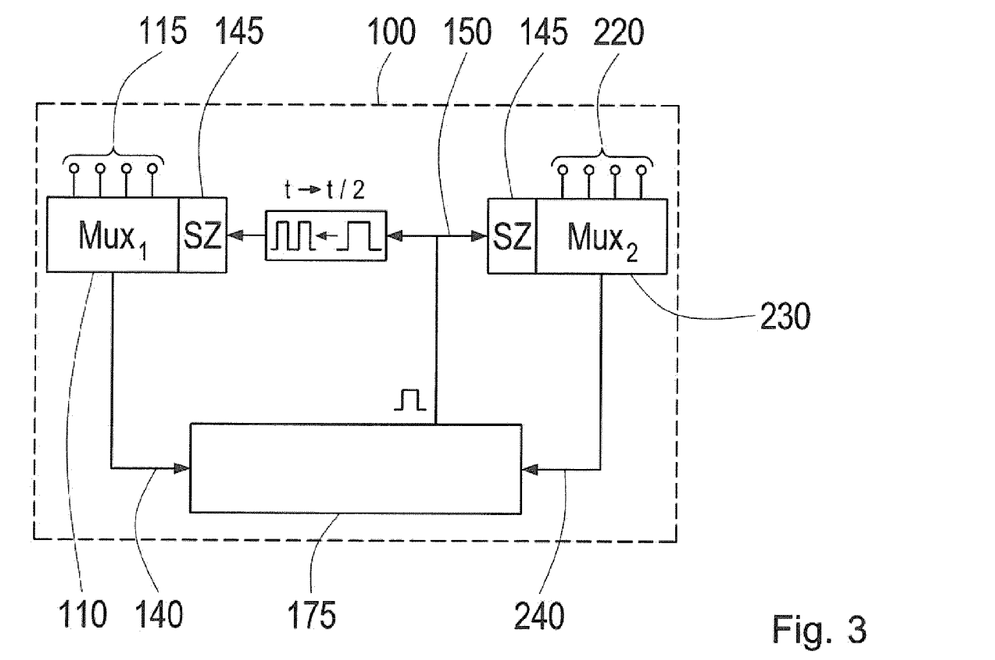
FIG. 3 shows another block diagram of an interconnection of a connection unit ac-cording to an embodiment of a control lever.

FIG. 3 shows a circuit diagram of another embodiment for interconnecting a connection unit 110. In contrast to the embodiments shown in FIGS. 1 and 2A or 2B, the clock 150 is not generated by a clock 155 in the gear selector lever 100, but is conducted by a further signal line 300. This clock signal 150 can in particular be generated by the transmission control unit and outputted to the control lever 100, as shown in FIG. 3. This results in the further possibility of changing the external clock again and pass it on to each mux 110 or 230, e.g. by clock doubling or clock halving.

Figure 4:
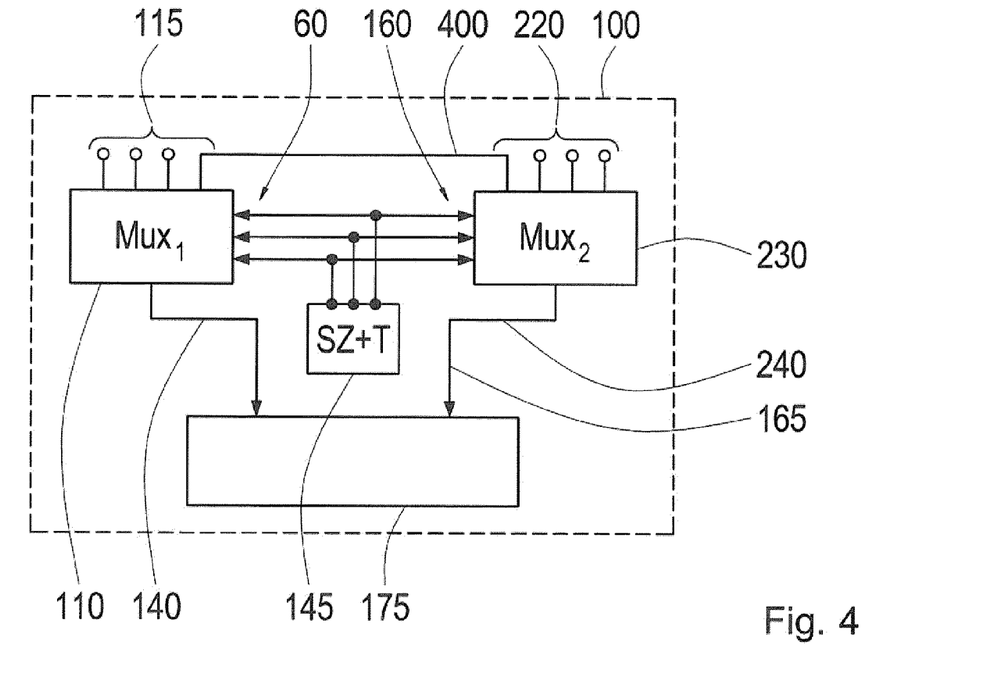
FIG. 4 shows another block diagram of an interconnection of a connection unit ac-cording to an embodiment of a control lever.

Furthermore according to a further embodiment, there is a possibility to allow a check of the connection quality (QoS) by a loop-back, as shown in the block diagram of FIG. 4. If always one input of the multiplexer mux1 (110) is connected to an input of mux2 (230) by a loop-back line 400, the transmission control unit 175 can check the resistance and simultaneously detect the position at which both multiplexers or connection units 110 and 230 have been since the last QoS testing. The two loop-back pins (inputs of the respective connection units 110 and 230) are connected via the control unit 175, for example, at the same clock, if the number of the e pins of mux1 and mux2 are different. The connection is then established according to the smallest common multiple kgV(eMux1;eMux2). In this case, this clock can be also generated by a clock (along with the synchronous counter 145) in the control lever 100 (as shown in FIG. 4) or supplied externally (for example, corresponding to FIG. 3) to the connection units 110 or 230, for example, coming from the transmission control unit 175.

Figure 5:
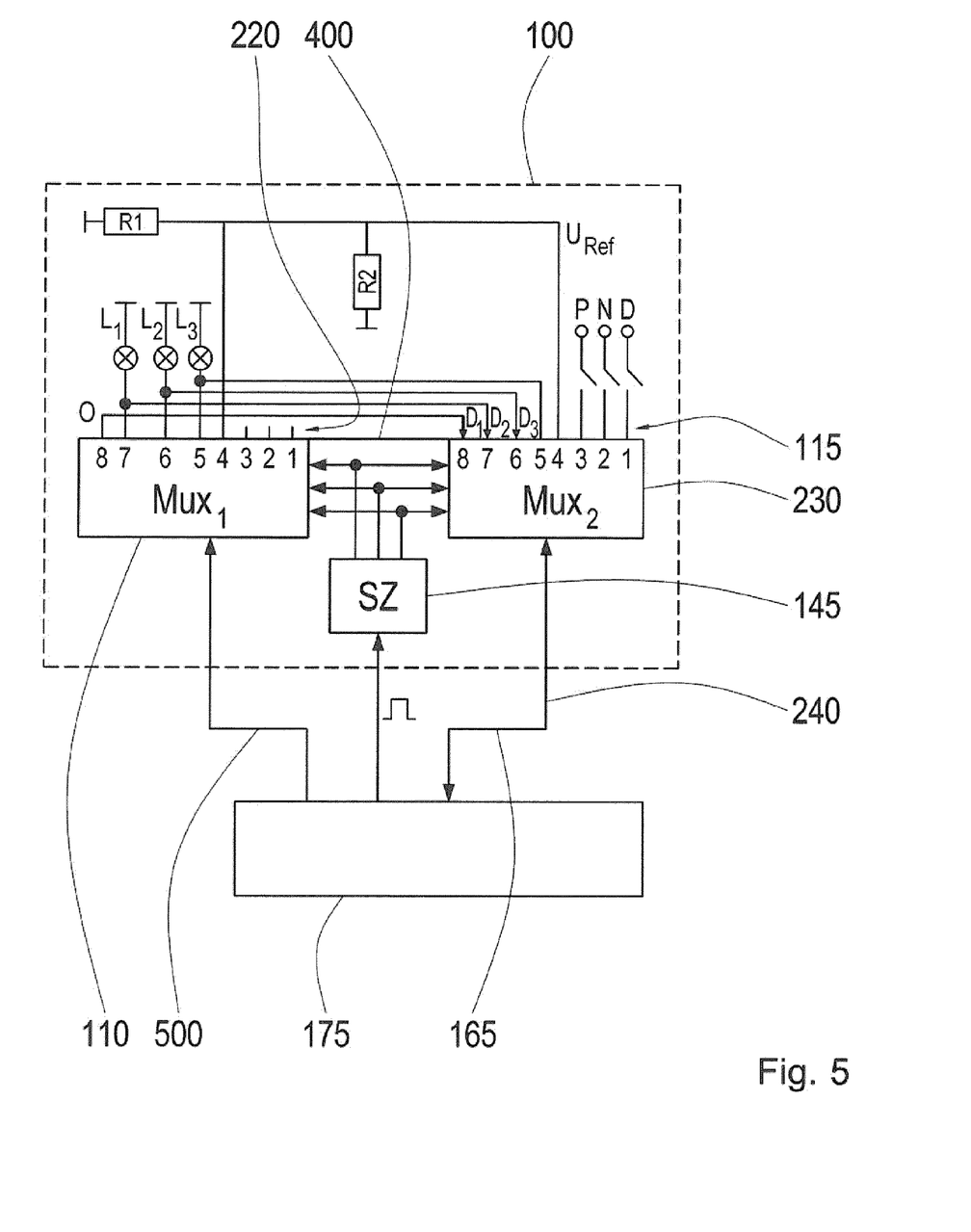
FIG. 5 shows another block diagram of an interconnection of a connection unit ac-cording to an embodiment of a control lever.

FIG. 5 shows a block diagram of an embodiment of a switching structure of a connection unit 110 for a control lever 100. Here, FIG. 5 illustrates a variant that is advantageous for example when the multiplexers 110 and 230 have a diode function. The clock 150 here comes from the transmission control unit 175, but can also be generated in the control lever 100. In this case, mux1 and mux2 are selected with the same number of inputs 115 and 220, and are clocked by the same synchronous counter 145 (SZ). In the example of FIG. 5, the inputs 1 to 3 of mux2 are used to read the sensors for the gear selector lever position (P=park position, N=neutral, idling, D=drive=driving position). Inputs 1 to 3 of mux1 are not used in this example, but can be used for other tasks, e.g. for reading switches not shown in FIG. 5. The input 4 connects the two multiplexers mux1 and mux2 with a reference voltage URef provided from the resistor network and the reference voltage supplying unit 200 by the two resistors R1 and R2 so that the transmission control unit 175 can detect the current stage of the processing of inputs through the input 220 of the second multiplexer 230 or mux2 currently connected to the output 240. For this purpose, for example, the transmission control unit 175 can send a signal 500 to an input of the first multiplexer mux1 or 110 which can be read by the transmission control unit 175 after the through-connection of the first multiplexer mux1 110 to the input 8 via the loop-back 400 and the position of the second multiplexer mux2 or 230 to the input 8 again via the output line 240 of the second multiplexer mux2.

Inputs 5 to 7 in mux1 switch the lamps L1 to L3, and through the diagnosis inputs D1 to D3 the corresponding outputs can be read back to mux1 over mux2. The line O is a loop (also called a loop-back 400), with which the transmission control unit 175 can check the connection quality and the function of the two multiplexers of FIG. 5.

For example, if in another embodiment with an interconnection as shown in FIG. 5, 16-channel multiplexers are used as $mux_1$ and $mux_2$, the inputs of the two multiplexers can be defined, for example, according to the table below:

| Output | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| $Mux_1$ | | (to be still defined) | | | | | | $U_{Ref}$ | $D_1$ | $D_2$ | $D_3$ | $D_4$ | $D_5$ | $D_6$ | $D_7$ | Loop-back |
| | | | | | | | | | | | Gear display: switch lamp power | | | | | |
| $Mux_2$ | P | R | N | D | M | M+ | M– | | $L_1$ | $L_2$ | $L_3$ | $L_4$ | $L_5$ | $L_6$ | $L_7$ | |
| | | | Gear detection: Signals of sensors | | | | | | | | Read power for lamps | | | | | |

Figure 6:
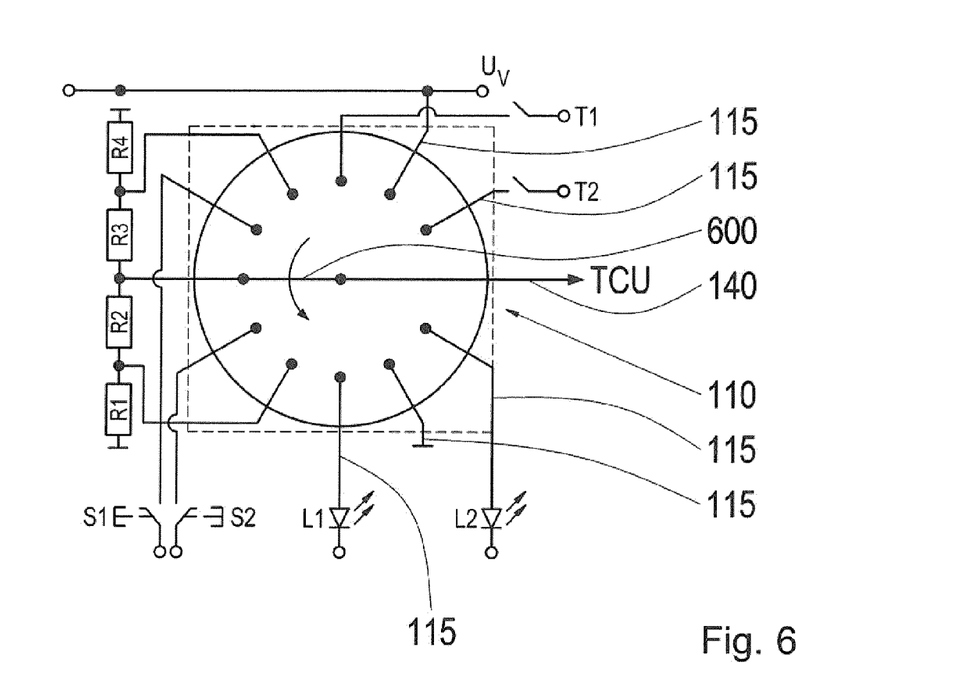
FIG. 6 shows another block diagram of an interconnection of a connection unit ac-cording to an embodiment of a control lever.
Figure 7:
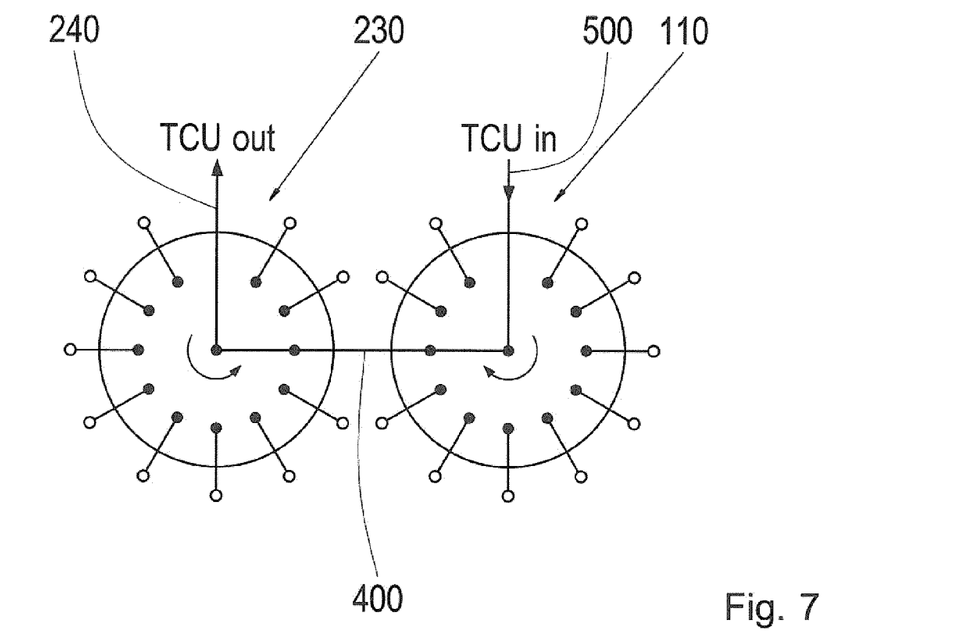
FIG. 7 shows another block diagram of an interconnection of a connection unit ac-cording to an embodiment of a control lever.

The approach presented here can be implemented by technically very simply configured connection units. FIG. 7 shows an embodiment of a connection unit 110 as it is connected as shown in FIG. 2A. Here, the connection unit 110 comprises a pointer 600 connected to the output 140, which is rotatably mounted in the center of a star-shaped arrangement of inputs 115. By switching the synchronous counter 145, which is not shown in FIG. 6, the pointer 600 is connected further in the arrow direction so that it cyclically connects electrically conductively, like a multiplexer, the inputs 115 of the connection unit 110 to the output 140. Such an embodiment of the connection unit 110 provides the possibility to arrange the connection unit 110 in the control lever 100 without a need for much space. FIG. 6 thus shows an exemplary circuit of a multiplexer with switches (T1, T2), sensors, for example from reed contacts (S1, S2), LEDs (L1, L2) and a resistor network (R1, . . . , R4).

FIG. 7 shows an example of a circuit how the connection units 110 and 230, for example according to the diagram of FIG. 5 can be coupled with a feedback loop 400 to be able to easily recognize, for example through the transmission control unit 175, a line quality. In this example, the connection unit 110 or 230 may be configured in accordance with the embodiment shown in FIG. 6.

The approach presented here provides a very elegant way to implement it in different scenarios. For example, the presented control lever 100 can be used as a gear selector lever or gear selector switch for controlling a transmission in a vehicle. Alternatively or additionally, the control lever can be used as a pitman arm, for example, for operating a windshield wiper, a turn signal light or a vehicle light or similar.

Several vehicle types come into consideration as the target application, such as low-cost small electric vehicles, which are currently provided with no manual transmission so that for such vehicle types a hundred percent equipment with a gear selector lever is to be expected. Furthermore, cost-sensitive types of vehicles, especially in the field of micro-cars are conceivable as a possible target application of the control lever presented here. In particular when a control device is already provided in the vehicle, this can be designed much cheaper and nonetheless reliable by simple reprogramming and simplifying or eliminating the communication lines between the control lever and the transmission control unit.

Figure 8:
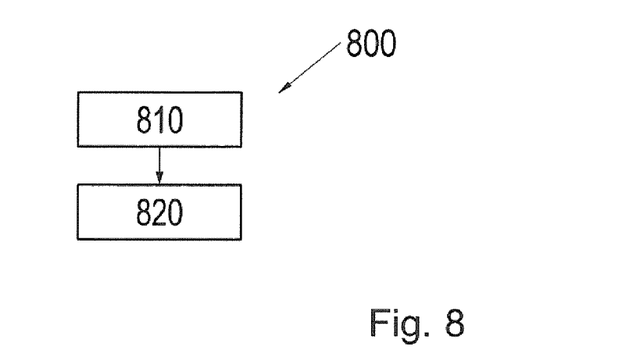
FIG. 8 shows a flow chart of a method for operating a control lever.

FIG. 8 shows an embodiment of a method 800 for operating a control lever according to a variant presented here. Here, the method includes a step 810 of connecting a first one of the inputs to the at least one output at a first point in time. Further, the method 800 includes a step 820 of coupling a second one of the inputs to the at least one output at a second point in time subsequent to the first point in time.

In summary, it should be noted that the approach presented above is essentially characterized by the following advantages. First, a simple and cost-effective design of the control lever can be implemented. Particularly advantageous is a marketing opportunity with an adapted transmission or a suitably adapted transmission control because the system cost can be effectively reduced here. The development effort for functional safety in the selector or control lever and in the transmission can be kept low because the transmission (which was developed for example for ASIL D) would only need an ASIL A and an ASIL-B function added.

Also conceivable is an embodiment of a control lever, in particular a gear selector lever for manually selecting a position with multiple latching steps, in which several positions are available to the operator of the control lever.

The control lever can be fitted with electrical components for sensing and providing a manual operation and for providing a signal for any external device, wherein the external device can be electrically connected to the control lever. This can also open a possibility to connect also further elements such as buttons and light sources to the output or the transmission control element. The control lever can in particular have at least one connection component, such as the connection unit 110, in the control lever which establishes an electrical connection between components of the control lever 100 and an external device (usually the transmission or the transmission control element). Such a connection of the inputs to the outputs of the control lever can be performed alternately. The approach presented here is especially convenient when the number of connected elements (lamps, sensors, switches, etc.) in the control lever 100 is greater (or at least equal to) the number of interconnections, which depart to the external device 175. In a particularly favorable embodiment, at least one electrical element can also be provided in the control lever 100, which is temporarily connected to the external device 175 by the connecting component 110 so that by the connection component 110, the external device 175 obtains for a short time a direct connection with the electrical switching elements or generally with components in the control lever 100. It is particularly favorable when the electrical connection between the buttons, sensors or lamps is effected in a connection unit 110 by at least one multiplexer or similar device in the control lever 100. Conceivable is also an embodiment in which at least one multiplexer can be included, which is controlled by a clock 155 so that the connection between the electric switching elements and the external device 175 is established periodically. Also, at least one multiplexer can be included in the control lever, which instead of an internal clock 155 is clocked by an external device, in particular by the transmission control unit 175 through a line as exemplarily shown in FIG. 3.

Figure 9:
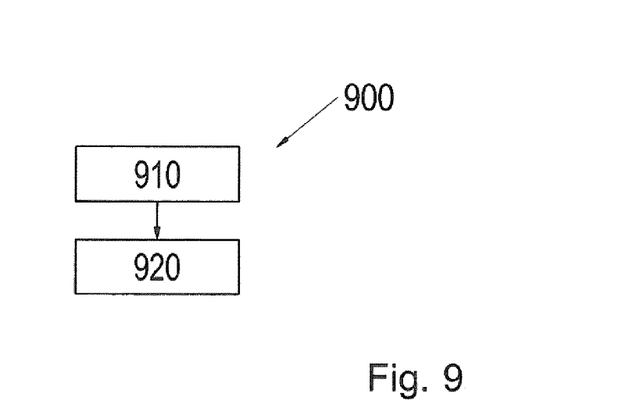
FIG. 9 shows a flow diagram of an embodiment of a method for evaluating a control lever signal.

In a further embodiment, the control lever has at least one additional connected electrical element in the control lever 100 which at least at one point in time in a cycle supplies exactly one of one or more defined electrical levels through the switched connection to the external device 175 so that the external device can identify or verify the correct time sequence of the connections, the function of the gear selector lever or the synchronization of the timing For this purpose, a method 900 for evaluating a control lever signal according to the flow chart of FIG. 9 can be provided, wherein the control lever signal is outputted from a variant of the above-described control lever, wherein the method 900 includes a step 910 of examining temporal sections of the control lever signal upon a predetermined reference signal level, and wherein the method 900 further includes a step of outputting 920 an output information representing a signal information which is contained in a temporal section of the control lever signal, which does not comprise the predetermined reference signal level.

Especially well can be checked a quality of the connection between the control lever and the transmission control unit when the control lever has a loop-like connection between a connection component such as the connection unit 110 in the control lever 100 and an additional line 400 or two connection components 110 and 230, as is exemplarily shown in FIG. 4.

According to a further embodiment, a combination of multiplexers is possible, in which one allows the switching of a component and the other is used for success monitoring/diagnostics (in particular reading the successful circuit). The embodiments described and shown in the figures are chosen only by way of example. Different embodiments can be combined wholly or in respect of individual characteristics. Also an embodiment may be supplemented by features of another embodiment.

Furthermore, steps can be executed and potentially repeated in a sequence other than the sequence described.

If an embodiment includes "and/or' link between a first feature and a second feature, it may be read so that the embodiment according to one variant comprises both the first feature and the second feature and, according to another embodiment, it includes either only the first feature or the second feature.

REFERENCE NUMERALS

100 Control lever
110 Connection unit, multiplexer
Mux Connection unit, multiplexer
115*a-f* Inputs of the connection unit
120 Functions of the operating lever or the gear selector lever, position P, position N, position D, position R, . . . .
130 Switching element
135 Sensor for detection of the position of the switching element, S1
140 Output of the connection unit
145 Synchronous counter SZ
150 Clock signal
155 Timer, clock generator T
160 Outputs of the synchronous counter, data word
165 Control lever signal 170 Micro processor
175 Transmission control unit
200 Reference voltage provision unit, resistor network with resistors R1, R2, R3, R4, . . . .
S1 Sensor
T1 First button
T2 Second button
L1 First lamp
L2 Second lamp
220 Inputs of the second connection unit
230 Second connection unit
235 Clock processing unit
240 Output of the second connection unit
400 Back-loop
500 Control unit of the first connection unit from the transmission control unit
600 Pointer of the connection unit
800 Method for operating a control lever
810 Step of connecting
820 Step of coupling
900 Method for evaluating a control lever signal
910 Step of examining
920 Step of outputting

The invention claimed is:

1. A control lever comprising:
a first connection unit with a plurality of inputs and at least one output,
wherein the at least one output is configured for outputting an operation signal that represents a position of the control lever,
wherein the number of inputs of the plurality of inputs exceeds the number of outputs of the at least one output,
wherein the first connection unit is configured to couple a first input of the plurality of inputs to the at least one output at a first point in time,
wherein the connection unit is configured to connect a second input of the plurality of inputs to the at least one output at a second point in time subsequent to the first point in time, and
wherein the first connection unit is configured to establish a connection between at least one of the plurality of inputs and the at least one output in response to a clock signal.

2. The control lever of claim 1, wherein the first connection unit is configured to separate the second input from the at least one output at the first point in time and/or to separate the first input from the at least one output at the second point in time.

3. The control lever of claim 1, wherein the first connection unit comprises a multiplexer and/or a counter.

4. The control lever of claim 1, further comprising a sensor connected with at least one input of the plurality of inputs and configured to detect the position of the control lever.

5. The control lever of claim 1, wherein the first connection unit is configured to connect the first input to the at least one output at a third point in time subsequent to the second point in time, and wherein the first connection unit is configured to cyclically repeat a connection of at least one of the first input with the at least one output and the second input with the at least one output.

6. The control lever of claim 1, further comprising a reference signal providing unit coupled to at least the second input of the first connection unit, wherein the reference signal providing unit is configured to provide a predetermined reference signal to the second input of the first connection unit.

7. The control lever of claim 6, wherein the reference signal providing unit is coupled to at least two inputs of the plurality of inputs, and wherein at least one further input of the plurality of inputs is arranged between the at least two inputs of the plurality of inputs.

8. The control lever of claim 1, further comprising a second connection unit coupled to the first connection unit, the second connection unit having a second plurality of inputs and at least one second output, wherein the second connection unit is configured to connect a first input of the second plurality of inputs to the at least one second output at a third point in time and to connect a second plurality of inputs to the at least one second output at a fourth point in time subsequent to the third point in time.

9. To the control lever of claim 8, wherein the second connection unit is configured to establish a connection of at least one input of the second plurality of inputs with the at least one second output of the second connection unit in response to a clock signal.

10. The control lever of claim 8, wherein at least one input of the second plurality of inputs is coupled to at least one input of the plurality of inputs of the first connection unit.

11. That the control lever of claim 8, wherein at least one input of the second plurality of inputs is coupled to the at least one output of the first connection unit.

12. A method for operating a control lever according to claim 1, the method comprising:
coupling a first input of the plurality of inputs with the at least one output at a first point in time; and
coupling a second input of the plurality of inputs with the at least one output at a second point in time following the first point in time.

13. A method for evaluating a control lever signal outputted from a control lever according to claim 1, the method comprising:
examining at least one temporal section of the control lever signal for a pre-determined reference signal level; and
outputting an output signal representing whether the at least one temporal section of the control lever signal has or does not have the pre-determined reference signal level.

* * * * *